(12) United States Patent
Tsen et al.

(10) Patent No.: US 8,213,195 B2
(45) Date of Patent: Jul. 3, 2012

(54) PULSE WIDTH MODULATION STEP WAVE AND SINE WAVE DRIVING DEVICE

(75) Inventors: Ting-Chin Tsen, Taipei (TW); Shu-Chia Lin, Taipei (TW); Wen-Yueh Hsieh, Taipei (TW)

(73) Assignee: INNO-TECH Co., Ltd., Taipei (TW)

( * ) Notice: Subject to any disclaimer, the term of this patent is extended or adjusted under 35 U.S.C. 154(b) by 402 days.

(21) Appl. No.: 12/691,739

(22) Filed: Jan. 22, 2010

(65) Prior Publication Data
US 2011/0182097 A1  Jul. 28, 2011

(51) Int. Cl.
*H02M 1/12* (2006.01)
*H02M 7/5387* (2007.01)

(52) U.S. Cl. .............................. 363/43; 363/98; 363/132

(58) Field of Classification Search .................... 363/17, 363/24–26, 40–43, 98, 131–134
See application file for complete search history.

(56) References Cited

U.S. PATENT DOCUMENTS

| 4,680,690 | A  | * | 7/1987  | Dickerson ........................ 363/43 |
| 4,920,474 | A  | * | 4/1990  | Bruning et al. .................. 363/97 |
| 5,821,703 | A  | * | 10/1998 | Callahan et al. ............... 315/317 |
| 5,995,391 | A  | * | 11/1999 | Davies et al. ................... 363/43 |
| 2010/0176794 | A1 | * | 7/2010  | Tsen et al. ..................... 324/120 |

* cited by examiner

*Primary Examiner* — Jessica Han
(74) *Attorney, Agent, or Firm* — Lin & Associates IP, Inc.

(57) ABSTRACT

A PWM step wave and sine wave driving device is provided. The driving device includes an ADC unit, an input processing unit, a first pulse width calculation unit, a register unit, a first output unit, a zero point detecting unit, a second pulse width calculation unit, a second output unit, and a multiplexer output unit. The driving device receives input signals, and output desired step wave or sine wave driving signals for driving an external electric device. The driving device detects a point of zero voltage of the system power supply by the zero point detecting unit. When the system power supply is abnormal, the first output unit outputs predetermined PWM step wave output signals, or the second output unit outputs predetermined PWM sine wave output signals. In such a way, the external electric device can be maintained for regular operation, so that the malfunction or breakdown thereof is prevented.

14 Claims, 8 Drawing Sheets

PULSE WIDTH MODULATION STEP WAVE AND SINE WAVE DRIVING DEVICE

BACKGROUND OF THE INVENTION

1. Field of the Invention

The present invention relates generally to a driving device, and more particularly, to a pulse width modulation (PWM) step wave and sine wave driving device in accordance with a predetermined operation mode, for avoiding system breakdown or failure caused by abnormal power supply of the system.

2. The Prior Arts

Many electric products or electronic apparatuses, e.g., transformers, motors, speakers, LED illuminating devices, LED displays, LCDs, or converters, require facilitation of driving devices for regular operation. However, such driving devices are required to have the capability of stably outputting driving signals without being affected by external noise and system power supply variation.

Typically, an electric device, e.g., a motor or a transformer is driven by alternating current (AC) signals, and thus can be driven with a full bridge driving stage constituted of a plurality of power transistors. The gate of each power transistor is controlled by a driver, so that the direction of the current flowing through the electric device alternatively varies. The most often used driving method is known as pulse width modulation (PWM). A conventional PWM employs pulse signals of different widths for achieving a precise control of the power transistor, so as to output the desired AC to the electric device.

Such a conventional technology has certain disadvantages. For example, the driving device is incapable of proactively detecting the variation of the system power supply for dynamically adjusting to achieve optimal driving signals to prevent the electric device from being further affected by the variation of the system power supply. Specifically, when the system power supply is in an abnormal condition. For example, an excessively high or low frequency may cause the driving device failing to output suitable driving signals. In that way, the electric device may fail to operate, or even be permanently damaged, even cause the entire operation system to breakdown. Therefore, it would be very much desired to provide a driving device for generating suitable driving signals in case the system power supply is in an abnormal condition, and maintaining to output stable driving signals against variation of the system power supply.

SUMMARY OF THE INVENTION

A primary objective of the present invention is to provide a PWM step wave and sine wave driving device. The driving device is adapted to be realized in an integrated circuit (IC) manner, and is adapted for working under a step wave operation mode and a sine wave operation mode. The driving device includes an analog-to-digital converter (ADC) unit, an input processing unit, a first pulse width calculation unit, a register unit, a first output unit, a zero point detecting unit, a second pulse width calculation unit, a second output unit, and a multiplexer output unit. The driving device is adapted for receiving input signals, and output desired step wave or sine wave driving signals in accordance with the demand of the system, for driving an external electric device. The driving device is further adapted for detecting a point of zero voltage of a system power supply by the zero point detecting unit. When the system power supply, e.g., a mains supply, is in an abnormal condition, the driving device is switched to the step wave operation mode so that the first output unit outputs a predetermined PWM step wave output signal, or the driving device is switched to the sine wave operation mode so that the second output unit outputs a predetermined PWM sine wave output signal, and then multiplexer output unit outputs a suitable driving signal. In such a way, external electric device obtains the suitable driving signal and can be maintained for regular operation, so that the malfunction or breakdown thereof is prevented.

The register unit sets up the step wave operation mode, the sine wave operation mode, and related operation parameters. The ADC unit and the input processing unit convert the input signal into a control signal. The first pulse width calculation unit and the first output unit receive the control signal and correspondingly generate a PWM step wave output signal according to the setting of the register unit. The second pulse width calculation unit and the second output unit receive the control signal and correspondingly generate a PWM sine wave output signal. Finally, the multiplexer output unit converts the PWM step wave output signal into a driving signal under the step wave operation mode or converts the PWM sine wave output signal into a driving signal under the sine wave operation mode. The driving signal is then outputted for driving the external electric device.

The multiplexer output unit further includes a low pass filter unit, for eliminating high frequency content from the PWM sine wave output signal so as to generate a low frequency driving signal. The low pass filter unit can be a capacitor filter, a resistor-capacitor filter, or a switched capacitor filter.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
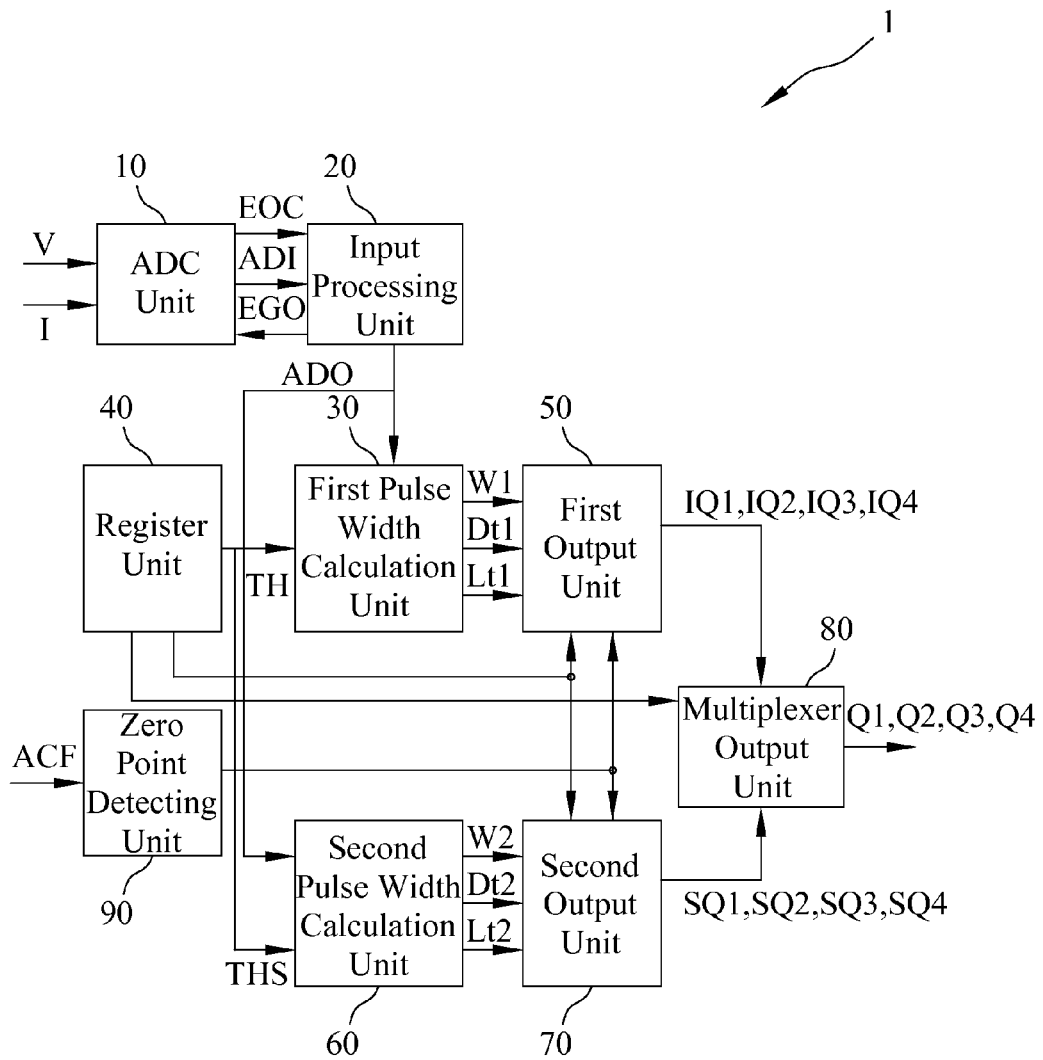
FIG. 1 is a schematic diagram illustrating a PWM step wave and sine wave driving device according to an embodiment of the present invention.

The accompanying drawings are included to provide a further understanding of the invention, and are incorporated in and constitute a part of this specification. The drawing illustrates embodiments of the invention and, together with the description, serves to explain the principles of the invention.

The present invention provides a PWM step wave and sine wave driving device is adapted to be configured in an IC manner, and can be operated in a step wave operation mode, and a sine wave operation mode, respectively, so as to correspondingly generate a step wave driving signal and a sine wave driving signal, respectively, thus outputting a driving signal for driving an external electric device.

FIG. 1 is a schematic diagram illustrating a PWM step wave and sine wave driving device according to an embodiment of the present invention. Referring to FIG. 1, there is shown a PWM step wave and sine wave driving device 1. The PWM step wave and sine wave driving device 1 includes an analog-to-digital converter (ADC) unit 10, an input processing unit 20, a first pulse width calculation unit 30, a register unit 40, a first output unit 50, a second pulse width calculation unit 60, a second output unit 70, a multiplexer output unit 80, and a zero point detecting unit 90. The PWM step wave and sine wave driving device 1 is adapted for receiving input signals and generating driving signals. The input signals include an input voltage signal V, an input current signal I, and a system power supply frequency signal ACF. The generated driving signals include a first driving signal Q1, a second driving signal Q2, a third driving signal Q3, and a fourth driving signal Q4.

There are a plurality of parameters saved in the register unit 40, and operation of the PWM step wave and sine wave driving device 1 is determined in accordance with the setting of the parameters saved in the register unit 40. The parameters at least include an operation mode selection parameter, and other related parameters. The operation mode selection parameter is adapted for selecting to operate under a sine wave operation mode or a step wave operation mode. The other related parameters may include a first dead time parameter, a first half period time parameter, a root mean square (RMS) voltage parameter of the system power supply, a second dead time parameter, a second half period time parameter, and a predetermined frequency parameter, for setting a first dead time, a first half period time, an RMS voltage of the system power supply, a second dead time, a second half period time, and a predetermined frequency of the driving device 1 of the present invention.

Figure 2:
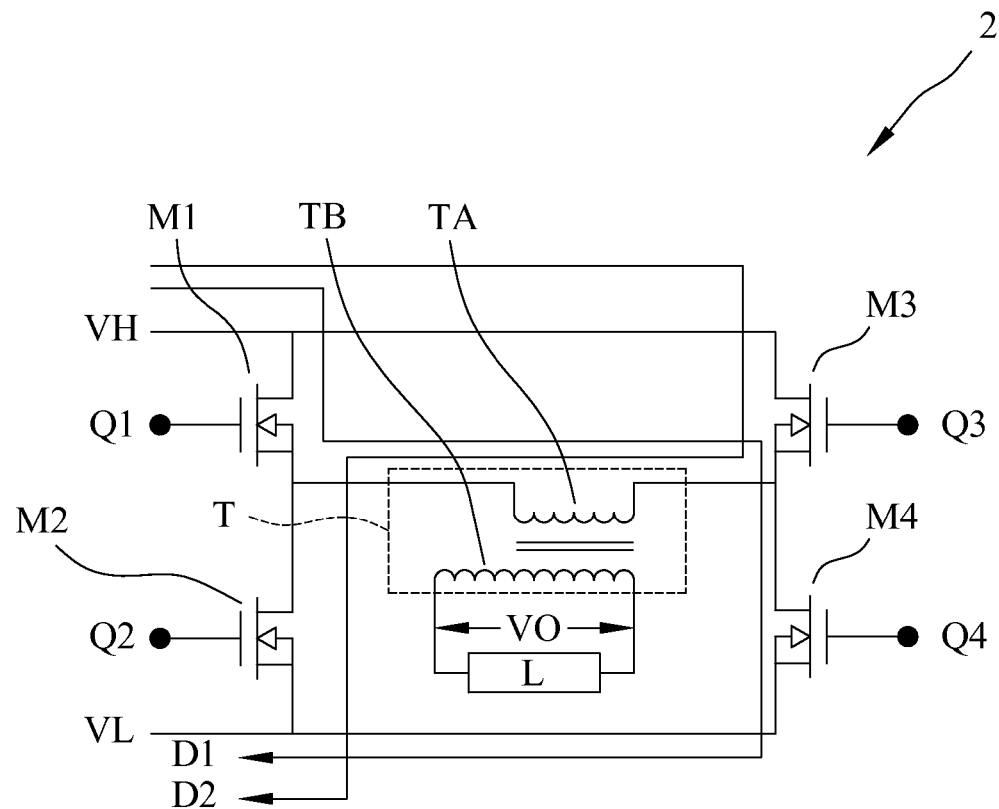
FIG. 2 is a schematic diagram illustrating an external electric device having a full bridge architecture and being driven by a PWM step wave signal according to an embodiment of the present invention.
Figure 3:
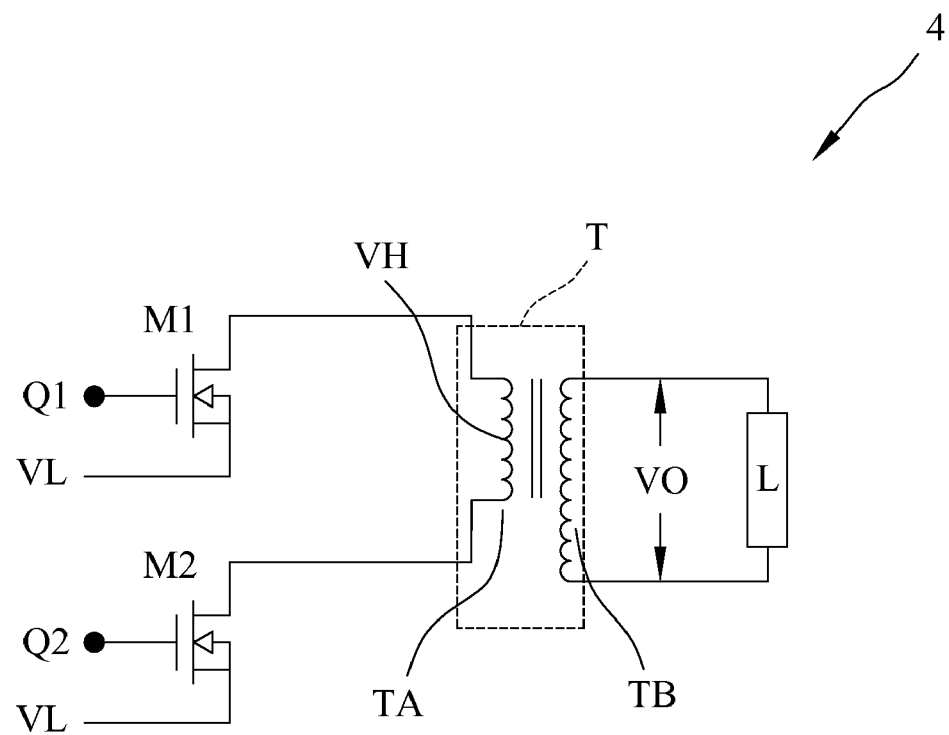
FIG. 3 is a schematic diagram illustrating an external electric device having a push-pull architecture and being driven by a PWM step wave signal according to an embodiment of the present invention.
Figure 4:
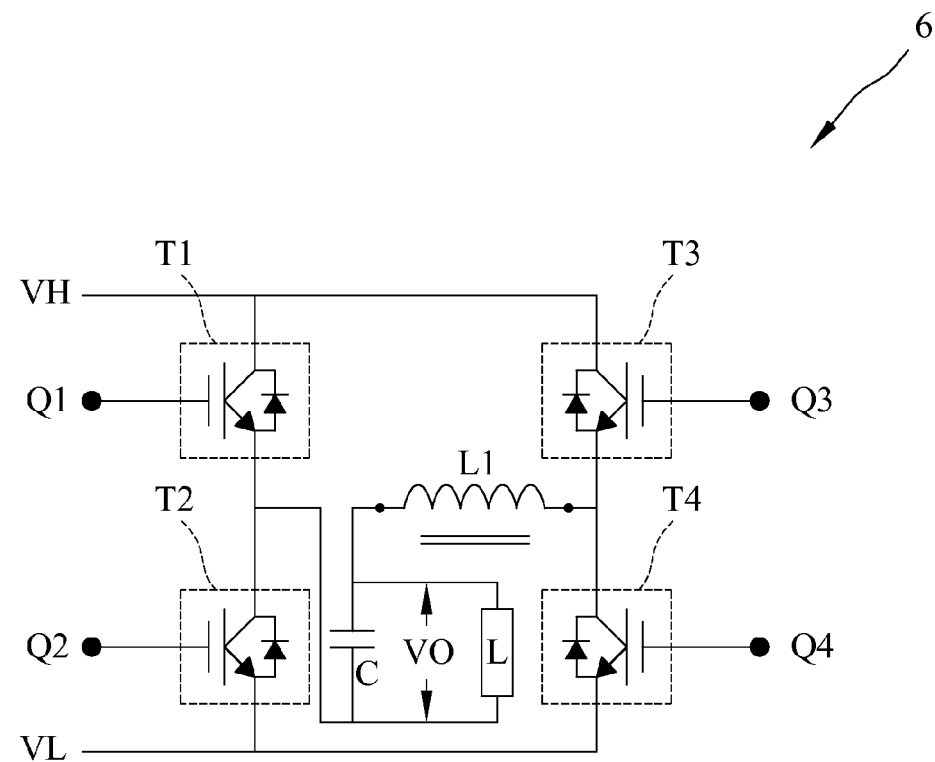
FIG. 4 is a schematic diagram illustrating an external electric device having a full bridge architecture and being driven by a PWM sine wave signal according to an embodiment of the present invention.
Figure 5:
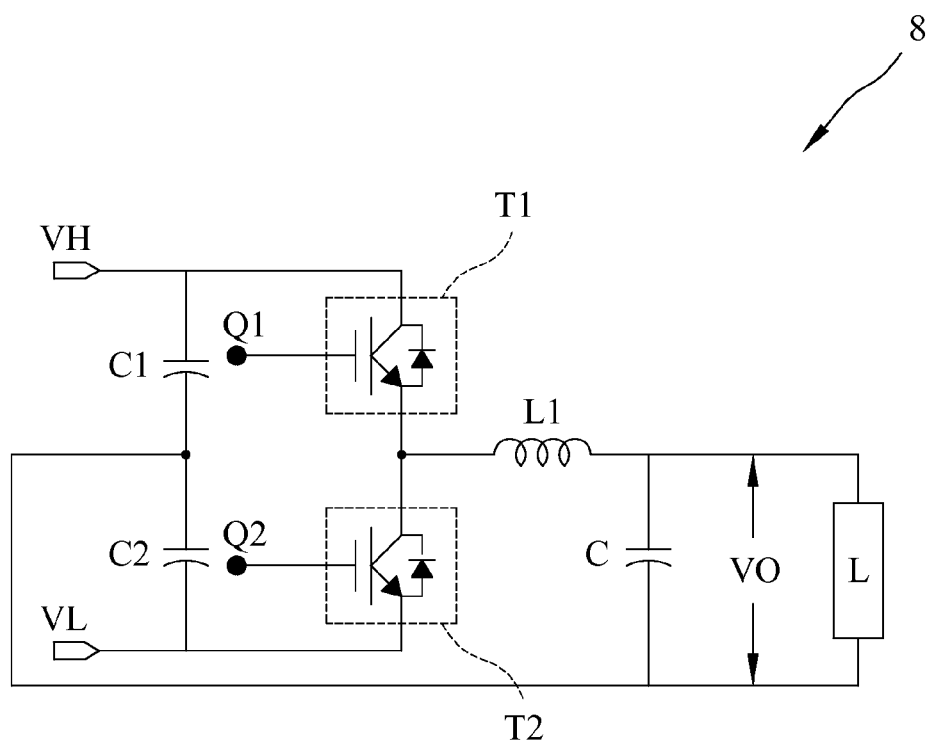
FIG. 5 is a schematic diagram illustrating an external electric device having a half bridge architecture and being driven by a PWM sine wave signal according to an embodiment of the present invention.

The PWM step wave and sine wave driving device 1 is adapted for driving different external electric devices, such as an electric device having a full bridge architecture, a half bridge architecture, or a push-pull architecture. For example, FIG. 2 shows an external electric device 2 having a full bridge architecture and being driven by a PWM step wave signal according to an embodiment of the present invention; FIG. 3 shows an external electric device 4 having a push-pull architecture and being driven by a PWM step wave signal according to an embodiment of the present invention; FIG. 4 shows an external electric device 6 having a full bridge architecture and being driven by a PWM sine wave signal according to an embodiment of the present invention; and FIG. 5 shows an external electric device 8 having a half bridge architecture and being driven by a PWM sine wave signal according to an embodiment of the present invention.

Referring to FIG. 2, the external electric device 2 includes a first driving transistor M1, a second driving transistor M2, a third driving transistor M3, a fourth driving transistor M4, a transformer T, and an operation component L. The external electric device 2 is adapted for operation under the step wave operation mode of the present invention. The fist driving transistor M1, the second driving transistor M2, the third driving transistor M3, and the fourth driving transistor M4 are preferably power transistors, e.g., power metal oxide semiconductor transistors (MOST) or power bipolar junction transistors (BJT). The transformer T includes a primary side TA and a secondary side TB. Each of the primary side TA and the secondary side TB includes a first terminal and a second terminal The operation component L for example can be a motor, an adapter, a power supply, a transformer, or an inverter which can be applied in a backlight module of an LCD.

For more clearly illustrating the characteristic of the present invention, the first driving transistor M1, the second driving transistor M2, the third driving transistor M3, and the fourth driving transistor M4 are exemplified with but not restricted to be power MOSTs, and a filter unit L1 is exemplified with but not restricted to be a filter inductor. It is worth mentioning that the first driving transistor M1, the second driving transistor M2, the third driving transistor M3, and the fourth driving transistor M4 can include conducting diodes (not shown in the drawings) for coupling the sources with the drains for conducting reverse currents and providing a protection thereto.

As shown in FIG. 2, the gates of the first driving transistor M1, the second driving transistor M2, the third driving transistor M3, and the fourth driving transistor M4 are coupled with the first driving signal Q1, the second driving signal Q2, the third driving signal Q3, and the fourth driving signal Q4, respectively. The drains of the first driving transistor M1 and the third driving transistor M3 are coupled to a high voltage power source line VH. The high voltage power source line VH for example is a system power supply, or a stabilized voltage source obtained by stabilizing the voltage of the system power supply. The sources of the second driving transistor M2 and the fourth driving transistor M4 are coupled to a low voltage power source line VL. The low voltage power source line VL is either a ground level or a negative voltage. The source of the first driving transistor M1 is coupled to the drain of the second driving transistor M2 and the first terminal of the primary side TA. The source of the third driving transistor M3 is coupled to the drain of the fourth driving transistor M4 and the second terminal of the primary side TA. The first terminal and the second terminal of the secondary side TB are coupled to a first terminal and a second terminal of the operation component L. A voltage applied over the first terminal and the second terminal of the secondary side TB is a terminal voltage VO.

The terminal voltage VO can be processed by a voltage attenuator (not shown in the drawings) to obtain the input voltage signal V as shown in FIG. 1. Meanwhile, the current flowing through the operation component L can be processed by a current attenuator (not shown in the drawings) to obtain an input current signal I as shown in FIG. 1. In that way, a feedback mechanism is established, for providing a stable voltage and current to the operation component L.

As shown in FIG. 2, the first driving signal Q1, the second driving signal Q2, the third driving signal Q3, and the fourth driving signal Q4 respectively control the first driving transistor M1, the second driving transistor M2, the third driving transistor M3, and the fourth driving transistor M4 to turn on or turn off, so that the current flowing through the operation component L alternatively presents a first current direction D1 and a second current direction D2.

Referring to FIG. 3, there is shown an external electric device 4 having a push-pull architecture and being driven by a PWM step wave signal according to an embodiment of the present invention. The external electric device 4 includes a first driving transistor M1, a second driving transistor M2, a transformer T, and an operation component L, and is adapted for operation under the step wave operation mode. It should be noted that the external electric device 4 is similar to the external electric device 2 as shown in FIG. 2, except the following differences. The external electric device 4 does not need the third driving transistor M3 and the fourth driving transistor M4. The drain of the first driving transistor M1 is coupled to the first terminal of the primary side TA of the transformer T, and the drain of the second driving transistor M2 is coupled to the second terminal of the primary side TA of the transformer. The primary side TA of the transformer T includes an intermediate tap coupled to the high voltage power source line VH. The sources of the first driving transistor M1 and the second driving transistor M2 are coupled to the low voltage power source line VL. The other details and operation of the external electric device 4 can be learnt by referring to the teaching regarding the external electric device 2 of FIG. 2, and are not to be iterated hereby.

FIG. 4 shows an external electric device 6 having a full bridge architecture and being driven by a PWM sine wave signal according to an embodiment of the present invention. Referring to FIG. 4, the external electric device 6 includes a first driving transistor T1, a second driving transistor T2, a third driving transistor T3, a fourth driving transistor T4, a filter capacitor C, a filter inductor L1, and an operation component L. The external electric device 6 is adapted for operation under the sine wave operation mode of the present invention. The first driving transistor T1, the second driving transistor T2, the third driving transistor T3, and the fourth driving transistor T4 for example are power transistors, such as MOSTs or BJT. A voltage applied over the filter capacitor C is the terminal voltage VO. The operation component L for example can be a motor, an adapter, a power supply, a transformer, or an inverter which can be applied in a backlight module of an LCD.

For more clearly illustrating the characteristic of the present invention, the first driving transistor T1, the second driving transistor T2, the third driving transistor T3, and the fourth driving transistor T4 are exemplified with but not restricted to be BJTs.

FIG. 4 shows an external electric device 6 having a full bridge architecture and being driven by a PWM sine wave signal according to an embodiment of the present invention. Referring to FIG. 4, the bases of the first driving transistor T1, the second driving transistor T2, the third driving transistor T3, and the fourth driving transistor T4 are coupled to the first driving signal Q1, the second driving signal Q2, the third driving signal Q3, and the fourth driving signal Q4, respectively. It is worth mentioning that the first driving transistor T1, the second driving transistor T2, the third driving transistor T3, and the fourth driving transistor T4 can include conducting diodes (not shown in the drawings) for coupling the emitters with the collectors for conducting reverse currents and providing a protection thereto. The collectors of the first driving transistor T1 and the third driving transistor T3 are coupled to a high voltage power source line VH. The emitters of the second driving transistor T2 and the fourth driving transistor T4 are coupled to a low voltage power source line VL. The emitter of the first driving transistor T1 is coupled to the collector of the second driving transistor T2, a first terminal of the filter capacitor C, and a first terminal of the operation component L. A second terminal of the filter capacitor C is coupled to a second terminal of the operation component L and a first terminal of the filter inductor L1. A second terminal of the filter inductor L1 is coupled to the emitter of the third driving transistor T3 and the collector of the fourth driving transistor T4.

A voltage applied over the first terminal and the second terminal of the operation component L is the terminal voltage VO. The terminal voltage VO can be processed by a voltage attenuator (not shown in the drawings) to obtain the input voltage signal V as shown in FIG. 1. Meanwhile, the current flowing through the operation component L can be processed by a current attenuator (not shown in the drawings) to obtain an input current signal I as shown in FIG. 1. In that way, a feedback mechanism is established, for providing a stable voltage and current to the operation component L.

The first driving signal Q1, the second driving signal Q2, the third driving signal Q3, and the fourth driving signal Q4 respectively control the first driving transistor T1, the second driving transistor T2, the third driving transistor T3, and the fourth driving transistor T4 to turn on or turn off, so that the current flowing through the operation component L alternatively changes.

FIG. 5 shows an external electric device 8 having a half bridge architecture and being driven by a PWM sine wave signal according to an embodiment of the present invention. Referring to FIG. 5, the external electric device 8 includes a first driving transistor T1, a second driving transistor T2, a first capacitor C1, a second transistor C2, a filter capacitor C, a filter inductor L1, and an operation component L. The external electric device 8 is adapted for operation under the sine wave operation mode of the present invention.

Comparing the external electric device 8 as shown in FIG. 5 with the external electric device 6 as shown in FIG. 4, it can be found that they are similar except the following. The external electric device 8 does not need the third driving transistor T3 and the fourth driving transistor T4, but further includes the first capacitor C1, and the second capacitor C2. The first capacitor has a first terminal coupled to the high voltage power source line VH and a second terminal coupled to a first terminal of the second capacitor C2. The second capacitor C2 further has a second terminal coupled to the low voltage power source line VL. The emitter of the first driving transistor T1 is coupled to the collector of the second driving transistor T2, and a first terminal of the filter inductor L1. A second terminal of the filter inductor L1 is coupled to the first terminal of the filter capacitor C and the first terminal of the operation component L. The second terminal of the filter capacitor C is coupled to the second terminal of the operation component L, and the second terminal of the first capacitor C1. The voltage applied over the filter capacitor C is the terminal voltage VO.

The further details of the external electric device 8 can be learnt by referring to the teaching of the external electric device 6 and are not to be iterated hereby.

The ADC unit 10, the input processing unit 20, the first pulse width calculation unit 30, the register unit 40, the first output unit 50, the second pulse width calculation unit 60, the second output unit 70, the multiplexer output unit 80, and the zero point detecting unit 90 of the driving device 1 are to be illustrated in more details below.

The ADC unit 10 receives the input voltage signal V, and the input current signal I, to conduct an analog-to-digital conversion operation in accordance with a conversion initial signal EGO. Upon completion of the analog-to-digital conversion, a conversion completion signal EOC and a conversion input signal ADI are generated. The conversion input signal ADI for example is a digital signal including a plurality of bits, e.g., a 10-bit digital signal. The ADC unit 10 sequentially receives the input voltage signal V and the input current signal I, and then sequentially outputs the conversion input signal ADI corresponding to the input voltage signal V and the input current signal I. That means the conversion input signal ADI contains information related to the current flowing through the operation component L and the terminal voltage V0.

The input processing unit 20 is adapted to generate the conversion initial signal EGO at a suitable time and output the generated conversion initial signal EGO for informing the ADC unit 10 to start the analog-to-digital conversion operation. When receiving the conversion completion signal EOC from the ADC unit 10, the input processing unit 20 outputs the conversion input signal ADI into a conversion output signal ADO.

The first pulse width calculation unit 30 receives the conversion output signal ADO from the input processing unit 20, and generates a first pulse width W1, a first dead time Dt1, and a first low level time Lt1 in accordance with the setting saved in the register unit 40. The first output unit 50 receives the first pulse width W1, the first dead time Dt1, and the first low level time Lt1 from the first pulse width calculation unit 30, and processes them to generate a first step wave driving signal IQ1, a second step wave driving signal IQ2, a third step wave driving signal IQ3, and a fourth step wave driving signal IQ4.

Figure 6:
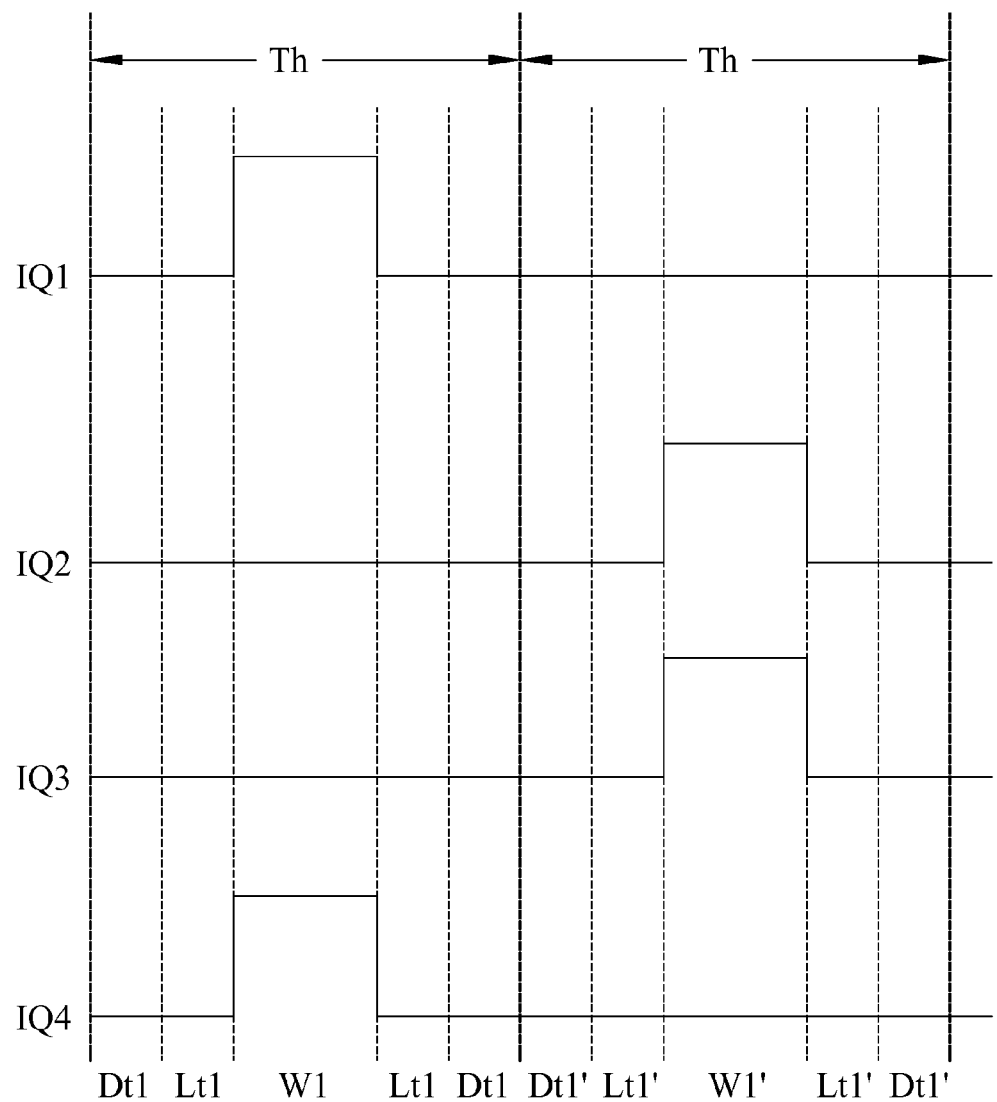
FIG. 6 illustrates the waveform of the PWM step wave driving signal according to an embodiment of the present invention.

FIG. 6 illustrates the waveform of the PWM step wave driving signal according to an embodiment of the present invention. Referring to FIG. 6, when the register unit 40 is set to operate under the step wave operation mode, the multiplexer output unit 80 outputs the first step wave driving signal IQ1, the second step wave driving signal IQ2, the third step wave driving signal IQ3, and the fourth step wave driving signal IQ4 to the first driving signal Q1, the second driving signal Q2, the third driving signal Q3, and the fourth driving signal Q4, respectively. In such a way, the alternative current directions D1 and D2 as shown in FIG. 2 can be realized. It is still worth mentioning that it is also possible to solely use the first step wave driving signal IQ1 and the second step wave driving signal IQ2 as shown in FIG. 6 to drive the external electric device 4 as shown in FIG. 3.

In the former half period, the first step wave driving signal IQ1 and the fourth step wave driving signal IQ4 pass through the multiplexer unit 80 and turn on the first driving transistor M1 and the fourth driving transistor M4, so that the current flowing through the operation component L flows along the first current direction Dl. In the later half period, the second step wave driving signal IQ2 and the third step wave driving signal IQ3 pass through the multiplexer unit 80, and turn on the second driving transistor M2 and the third driving transistor M3, so that the current flowing through the operation component L flows along the second direction D2.

The first pulse width W1 is calculated in accordance with the equation of "W1=Th*(Vrms/Vp)$^2$", where Th represents the first half period time under the step wave operation mode, Vrms represents the root mean square (RMS) voltage of the system power supply, and Vp represents a peak voltage of the input voltage signal V, while the first half period time Th and the RMS voltage Vrms are set by the register unit 40. For example, when the mains supply serves as the system power supply, the first half period time Th is 0.02 second, and the RMS voltage is 155V. The first dead time Dt1 is also set by the register unit 40, and the first low level time Lt1 is calculated in accordance with the equation of "Lt1=(Th−W1−2*Dt1)/2". The first dead time is adapted for avoiding the first driving transistor M1 and the second driving transistor M2 being turned on at the same time so that a large current may spark over the serially connected first driving transistor M1 and second driving transistor M2 to damage them. For the similar reason, in the later half period, the serially connected third driving transistor M3 and fourth driving transistor M4 are avoided from being turned on at the same time.

It should be noted that the register unit 40 is capable of set different parameters with respect to the former half period and the later half period. For example, the parameters of the first half period time, the RMS voltage, the peak voltage, and the first dead time can be set with different values with respect to the former half period and the later half period, so that the first pulse width calculation unit 30 can generate a first pulse width W1', a first dead time Dt1', and a first low level time Lt1' with respect to the later half period, which are different from the former period, as shown in FIG. 3.

Figure 7:
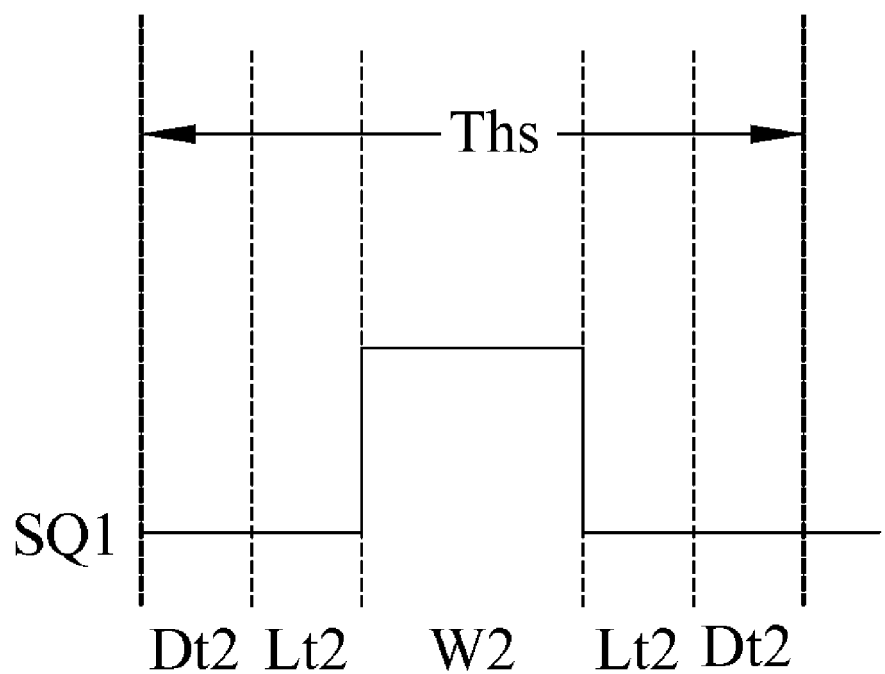
FIG. 7 illustrates the calculation of the second pulse width according to an embodiment of the present invention.
Figure 8:
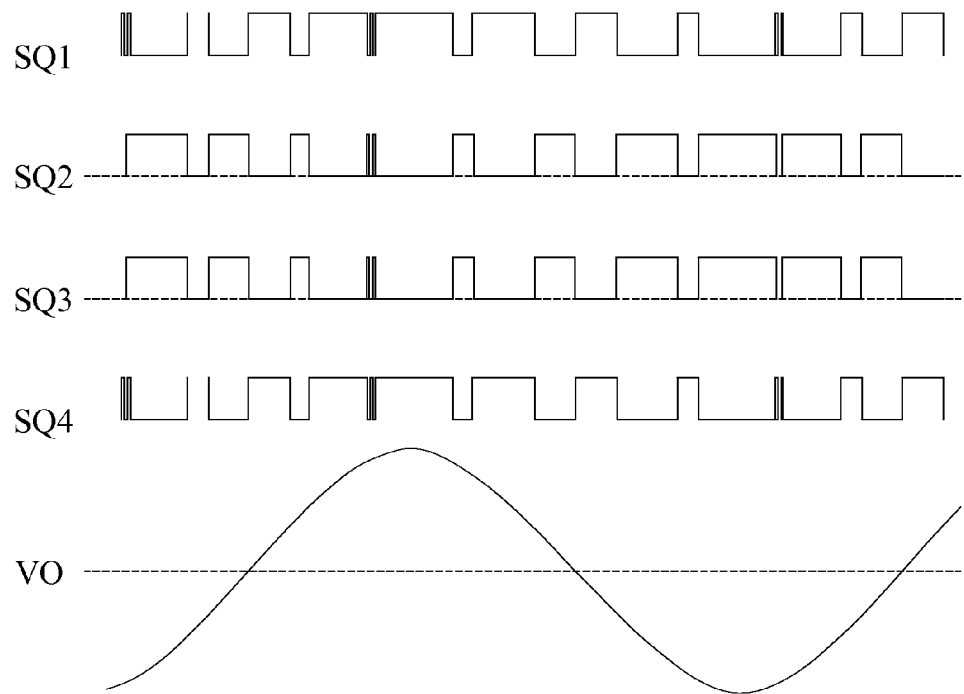
FIG. 8 illustrates the waveform of the PWM sine wave driving signal according to an embodiment of the present invention.

The second pulse width calculation unit 60 receives the conversion output signal ADO from the input processing unit 20, and generates a second pulse width W2, a second dead time Dt2, and a second low level time Lt2 according to the setting saved in the register unit 40. The second pulse width W2, the second dead time Dt2, and the second low level time Lt2 are then processed by the second output unit 70, for generating a first sine wave driving signal SQ1, a second sine wave driving signal SQ2, a third sine wave driving signal SQ3, and a fourth sine wave driving signal SQ4. FIG. 7 illustrates the calculation of the second pulse width W2 according to an embodiment of the present invention. FIG. 8 illustrates the waveform of the PWM sine wave driving signals according to an embodiment of the present invention. It should be noted that it is also possible to solely use the first sine wave driving signal SQ1 and the second sine wave driving signal SQ2 as shown in FIG. 6 to drive the external electric device 8 as shown in FIG. 5.

The second pulse width W2 is calculated in accordance with the equation of "W2=W2max*Sin θ", where W2max represents the maximum of the second pulse width, and θ represents a phase angle. The maximum of the second pulse width, i.e., W2max is defined by the equation of "W2max=Ths*(Vrms/Vp)$^2$", where Ths represents a second half period time under the sine wave operation mode, and the RMS voltage Vrms and the peak value Vp are defined similar to the foregoing definition. The second dead time Dt2 is determined in accordance with the second dead time parameter saved in the register unit 40. The second low level time Lt2 can be calculated in a same manner as the first low level time Lt1, in that the second low level time Lt2 can be represented as: Lt2=(Ths−W2−2*Dt2)/2.

In accordance with the waveform shown in FIG. 5, the first sine wave driving signal SQ1, the second sine wave driving signal SQ2, the third sine wave driving signal SQ3, and the fourth sine wave driving signal SQ4 generated by the second output unit 70 are featured with the second dead time and the second low level time, so as to avoid the serially connected first driving transistor M1 and second driving transistor M2 being turned on at the same time, and avoid the serially connected third driving transistor M3 and fourth driving transistor M4 being turned on at the same time, thus providing protection thereto. Further details can be learnt by referring to the waveform and discussion with respect to FIG. 3, and are not to be iterated hereby.

The multiplexer unit 80 includes a low pass filter unit (not shown in the drawings), for eliminating the high frequency content from the PWM sine wave driving signals including the first sine wave driving signal SQ1, the second sine wave driving signal SQ2, the third sine wave driving signal SQ3, and the fourth sine wave driving signal SQ4, so as to generate smooth low frequency driving signals, i.e., the first driving signal Q1, the second driving signal Q2, the third driving signal Q3, and the fourth driving signal Q4. The first driving signal Q1, the second driving signal Q2, the third driving signal Q3, and the fourth driving signal Q4 are all low frequency signals, so that the terminal voltage V0 of the operation component represents a sine wave, as shown in FIG. 4. The low pass filter unit 80 for example can be a capacitor filter, a resistor-capacitor filter, or a switched capacitor filter.

The multiplexer unit 80 may further includes an output driving stage (not shown in the drawings). The output driving stage is adapted for adjusting voltage levels and currents of the first driving signal Q1, the second driving signal Q2, the third driving signal Q3, and the fourth driving signal Q4, according to the setting saved in the register unit 40, so as to provide a suitable driving capacity for maintaining regular operation of the first driving transistor M1, the second driving transistor M2, the third driving transistor M3, and the fourth driving transistor M4, and further generating desired voltage and current for the operation component L.

The zero point detecting unit 90 receives the system power supply frequency signal ACF, which represents the waveform of a reduction voltage of the system power supply, e.g., reduction from 110V to 5V or 3V. Therefore, the system power supply frequency signal ACF has the same frequency with the alternate system power supply. When the voltage value of the system power supply frequency signal ACF varies from a positive value via a zero value to a negative value, or otherwise varies from a negative value via the zero value to a positive value, the zero point detecting unit 90 generates a zero detecting signal ZP having a pulse waveform, for indicating the time point where the voltage value of the system power supply is zero. Such a zero point detecting unit 90 can be realized by a Schmitt trigger, or other circuits, e.g., a one-shot circuit.

The first output unit 50 and the second output unit 70 receive the zero point detecting signal ZP from the zero point detecting unit 90, and then determine whether or not the system power supply is in an abnormal condition. For example, a frequency counting value can be obtained by counting the zero point detecting signal ZP within a critical time. If the frequency counting value falls in a desired range, the system power supply is determined as working in a normal condition, or otherwise if the frequency counting value falls out of the desired range, the system power supply is determined as working in an abnormal condition. When the system power supply is determined as working in a normal condition, the first output unit 50 and the second output unit 70 generate PWM step wave driving signals and PWM sine wave driving signals respectively as foregoing discussed. When the system power supply is determined as working in an abnormal condition, the first output unit 50 and the second output unit 70 proactively generate predetermined step wave driving signals and predetermined sine wave driving signals. The multiplexer output unit 80 then generates corresponding driving signals to provide to the external electric device.

The predetermined step wave driving signals and predetermined sine wave driving signals can be step wave driving signals and sine wave driving signals corresponding to a predetermined frequency. For example, the predetermined frequency is either 50 Hz or 60 Hz of the mains supply, which can be determined by the setting saved in the register unit 40.

The register unit 40 includes a plurality of parameters saved therein for setting the operation modes of the driving device according to the present invention. The parameters include the selection of the step wave operation mode and the sine wave operation mode, the RMS voltage of the system power supply, the system power supply peak voltage, the predetermined frequency when the system power supply is in an abnormal condition, the half period time, and the dead time. The parameters saved in the register unit 40 can be set by an external unit via a system BUS (not shown in the drawings). The external unit for example can be a central processing unit (CPU), a microprocessor (MCU), or a logic circuit.

The driving device of the present invention has many advantages. For example, it is adapted to be realized in an IC manner, and can be dynamically adjusted in accordance with the frequency of the system power supply, so as to output an optimal driving signal to the external electric device, thus eliminating the affection to the external electric device caused by the variation of the system power supply. Meanwhile, the driving device is also adapted for dynamically adjusting the PWM step wave driving signals or the PWM sine wave driving signals in accordance with the feedback signal of the operation component, so as to maintain the regular operation of the external electric device. As such, the driving device of the present invention is particularly superior to the conventional technology of employing a built-in firmware or an extension firmware.

Further, the driving device of the present invention is adapted for output step wave driving signals and sine wave driving signals according to the setting saved in the register unit so as to get in compliance with different external electric devices. As such, the application field of the present invention is extended thereby.

The driving device of the present invention is also featured in that when the system power supply is suddenly shut down, the driving device is still capable of outputting driving signals to maintain the external electric device for regular operation, so as to provide a further protection to the external electric device, thus further improving the operation stability and reliability of the entire system.

The driving device of the present invention is also featured in that the parameters saved in the register unit can be set by the external unit so as to improve the flexibility of the system application, e.g., selecting one from the step wave operation mode and the sine wave operation mode, or selecting the voltage level or current value of the driving stage of the multiplexer unit.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A pulse width modulation (PWM) step wave and sine wave driving device, adapted for receiving input signals, and generating driving signals for driving an external electric device, the input signals comprising an input voltage signal, an input current signal, and a system power supply frequency signal, wherein the input voltage signal and the input current signal are generated by the external electric device, and the system power supply frequency signal represents a frequency of a system power supply, the driving signals comprising a first driving signal, a second driving signal, a third driving signal, and a fourth driving signal, the driving device are adapted for working under a step wave operation mode and a sine wave operation mode, the driving device comprising:

a register unit, containing a plurality of parameters saved therein, for setting the operation of the driving device, wherein the parameters comprise an operation mode selection parameter, a first dead time parameter, a first half period time parameter, a root mean square (RMS) voltage parameter of the system power supply, a second dead time parameter, a second half period time parameter, and a predetermined frequency parameter, for respectively determining to select one from the sine wave operation mode and the step wave operation mode, and setting a first dead time, a first half period time, an RMS voltage of the system power supply, a second dead time, a second half period time, and a predetermined frequency;

an analog-to-digital converter (ADC) unit, receiving the input voltage signal and the input current signal, and conducting an analog-to-digital conversion operation on the received input voltage signal and input current signal according to a conversion initial signal, wherein when the analog-to-digital conversion operation is completed, the ADC unit generates a conversion completion signal and a conversion input signal;

an input processing unit, generating and outputting the conversion initial signal, for informing the ADC unit to start the analog-to-digital conversion operation, wherein when the input processing unit receives conversion completion signal from the ADC unit, the input processing unit outputs the conversion input signal to a conversion output signal;

a first pulse width calculation unit, receiving the conversion output signal from the input processing unit, and generating a first pulse width, a first dead time, and first low level time according to the first pulse width parameter, the first dead time parameter, the first half period time parameter, the RMS voltage parameter of the system power supply;

a first output unit, receiving the first pulse width, the first dead time, and the first low level time from the first pulse width calculation unit, for generating a first step wave driving signal, a second step wave driving signal, a third step wave driving signal, and a fourth step wave driving signal;

a second pulse width calculation unit, receiving the conversion output signal from the input processing unit, and generating a second pulse width, a second dead time, and a second low lever time according to the second pulse width parameter, the second dead time parameter, the second half period time parameter, the RMS voltage parameter of the power supply;

a second output unit, for receiving the second pulse width, the second dead time, and the second low level time from the second pulse width calculation unit, for generating a first sine wave driving signal, a second sine wave driving signal, a third sine wave driving signal, and a fourth sine waved driving signal;

a multiplexer output unit, comprising a low pass filter unit, receiving the first step wave driving signal, the second step wave driving signal, the third step wave driving signal, and the fourth step wave driving signal from the first output unit, and receiving the first sine wave driving signal, the second sine wave driving signal, the third sine wave driving signal, and the fourth sine wave driving signal from the second output unit, and generating the first driving signal, the second driving signal, the third driving signal, and the fourth driving signal according to the parameters saved in the register unit; and a zero point detecting unit, receiving the system power supply frequency signal, and generating a zero point detecting signal for indicating the time point where the voltage of the system power supply is zero, wherein the first output unit and the second output unit receive the zero point detecting signal from the zero point detecting unit, for determining whether or not the system power supply is in an abnormal condition, wherein when the system power supply is determined as in an abnormal condition, the first output unit and the second output unit set a predetermined frequency according to the predetermined frequency parameter saved in the register unit, wherein the first output unit generates the first step wave driving signal, the second step wave driving signal, the third step wave driving signal, and the fourth step wave driving signal corresponding to the predetermined frequency, and the second output unit generate the first sine wave driving signal, the second sine wave driving signal, the third sine wave driving signal, and the fourth sine wave driving signal corresponding to the predetermined frequency.

2. The driving device as claimed in claim 1, wherein the external electric device comprises a first driving transistor, a second driving transistor, a third driving transistor, a fourth driving transistor, a transformer, and an operation component, and is adapted for operation under the step wave operation mode, wherein the transformer comprises a primary side and a secondary side, each of the operation component, the primary side, the secondary side comprises a first end and a second end, each of the first driving transistor, the second driving transistor, the third driving transistor, and the fourth driving transistor comprises a gate, a source and a drain, wherein the gates of the first driving transistor, the second driving transistor, the third driving transistor, and the fourth driving transistor are coupled to the first driving signal, the second driving signal, the third driving signal, and the fourth driving signal respectively; the drains of the first driving transistor and the third driving transistor are coupled to a high voltage power source line, which is either the system power supply or a stabilized voltage source obtained by stabilizing the voltage of the system power supply; the sources of the second driving transistor and the fourth driving transistor are coupled to a low voltage power source line, which is a ground level or a negative voltage; the source of the first driving transistor is coupled to the drain of the second driving transistor and the first terminal of the primary side; the source of the third driving transistor is coupled to the drain of the fourth driving transistor and the second terminal of the primary side; the first terminal and the second terminal of the secondary side are coupled to the first terminal and the second terminal of the operation component, respectively; and a voltage applied over the first terminal and the second terminal of the secondary side is a terminal voltage; and the terminal voltage can be processed by a voltage attenuator to obtain the input voltage signal, and a current flowing through the operation component can be processed by a current attenuator to obtain the input current signal.

3. The driving device as claimed in claim 1, wherein the external electric device comprises a first driving transistor, a second driving transistor, a transformer, and an operation component, and is adapted for operation under the step wave operation mode, wherein the transformer comprises a primary side and a secondary side, each of the operation component, the primary side, the secondary side comprises a first end and a second end, and each of the first driving transistor and the second driving transistor comprises a gate, a source and a drain, wherein the gates of the first driving transistor and the second driving transistor are coupled to the first driving signal and the second driving signal respectively; the drain of the first driving transistor is coupled to the first terminal of the primary side; the drain of the second driving transistor is coupled to the second terminal of the primary side; the primary side comprises an intermediate tap coupled to a high voltage power source line, which is either the system power supply or a stabilized voltage source obtained by stabilizing the voltage of the system power supply; the sources of the first driving transistor and the second driving transistor are coupled to a low voltage power source line, which is a ground level or a negative voltage; the first terminal and the second terminal of the secondary side are coupled to the first terminal and the second terminal of the operation component, respectively; and a voltage applied over the first terminal and the second terminal of the secondary side is a terminal voltage; and the terminal voltage can be processed by a voltage attenuator to obtain the input voltage signal, and a current flowing through the operation component can be processed by a current attenuator to obtain the input current signal.

4. The driving device as claimed in claim 1, wherein the external electric device comprises a first driving transistor, a second driving transistor, a third driving transistor, a fourth driving transistor, a filter capacitor, a filter inductor, and an operation component, and is adapted for operation under the sine wave operation mode, wherein each of the filter capacitor, the filter inductor, and the operation component comprises a first terminal and a second terminal, and each of the first driving transistor, the second driving transistor, the third driving transistor, and the fourth driving transistor comprises a base, an emitter and a collector, wherein the bases of the first driving transistor, the second driving transistor, the third driving transistor, and the fourth driving transistor are coupled to the first driving signal, the second driving signal, the third driving signal, and the fourth driving signal respectively; the collectors of the first driving transistor and the third driving transistor are coupled to a high voltage power source line, which is either the system power supply or a stabilized voltage source obtained by stabilizing the voltage of the system power supply; the emitters of the second driving transistor and the fourth driving transistor are coupled to a low voltage power source line, which is a ground level or a negative voltage; the emitter of the first driving transistor is coupled to the collector of the second driving transistor, the first terminal of the filter capacitor, and the first terminal of the first operation component; the second terminal of the filter capacitor is coupled to the second terminal of the operation component and the first terminal of the filter inductor; the second terminal of the filter inductor is coupled to the emitter of the third driving transistor and the collector of the fourth driving transistor; and a voltage applied over the first terminal and the second terminal of the operation component is a terminal voltage; and the terminal voltage can be processed by a voltage attenuator to obtain the input voltage signal, and a current flowing through the operation component can be processed by a current attenuator to obtain the input current signal.

5. The driving device as claimed in claim 1, wherein the external electric device comprises a first driving transistor, a second driving transistor, a first capacitor, a second capacitor, a filter capacitor, a filter inductor, and an operation component, and is adapted for operation under the sine wave operation mode, wherein each of the first capacitor, the second capacitor, the filter capacitor, the filter inductor, and the operation component comprises a first terminal and a second terminal, and each of the first driving transistor and the second driving transistor comprises a base, an emitter and a collector, wherein the first terminal of the first capacitor is coupled to a high voltage power source line, which is either the system power supply or a stabilized voltage source obtained by stabilizing the voltage of the system power supply; the second terminal of the fist capacitor is coupled to the first terminal of the second capacitor; the second terminal of the second capacitor is coupled to a low voltage power source line, which is a ground level or a negative voltage; the emitter of the first driving transistor is coupled to the collector of the second driving transistor and the first terminal of the filter inductor; the second terminal of the filter inductor is coupled to the first terminal of the filter capacitor, and the first terminal of the operation component; the second terminal of the filter capacitor is coupled to the second terminal of the operation component and the second terminal of the first capacitor; and a voltage applied over the first terminal and the second terminal of the filter capacitor is a terminal voltage; and the terminal voltage can be processed by a voltage attenuator to obtain the input voltage signal, and a current flowing through the operation component can be processed by a current attenuator to obtain the input current signal.

6. The driving device as claimed in claim 1, wherein the parameters saved in the register unit are set by an external unit via a system BUS, and the external unit comprises a central processing unit (CPU), a microprocessor (MCU), or a logic circuit.

7. The driving device as claimed in claim 1, wherein the conversion output signal is a digital signal having 10 bits.

8. The driving device as claimed in claim 1, wherein the first pulse width is defined as: "$W1=Th*(Vrms/Vp)^2$", wherein W1 represents the first pulse width, Th represents the first half period time, Vrms represents the RMS voltage of the system power supply, and Vp represents a peak voltage of the input voltage signal V, wherein the first low level time Lt1 is defined as "$Lt1=(Th-W1-2*Dt1)/2$", wherein Lt1 represents the first low level time, and Dt1 represents the first dead time.

9. The driving device as claimed in claim 1, wherein the second pulse width is defined as "$W2=W2max*Sin\ \theta$", wherein W2 represents the second pulse width, W2max represents the maximum of the second pulse width, and $\theta$ represents a phase angle, wherein the maximum of the second pulse width is defined as "$W2max=Ths*(Vrms/Vp)^2$", wherein Ths represents a second half period time, Vrms represents the RMS voltage of the system power supply, and Vp represents a peak value of the input voltage signal, wherein the second low level time is defined as "$Lt2=(Ths-W2-2*Dt2)/2$", wherein Lt2 represents the second low level time, and Dt2 represents the second dead time.

10. The driving device as claimed in claim 1, wherein when the operation mode selection parameter saved in the register unit corresponds to the step wave operation mode, the multiplexer output unit outputs the first step wave driving signal, the second step wave driving signal, the third step wave driving signal, and the fourth step wave driving signal of the first output unit to the first driving signal, the second driving signal, the third driving signal, and the fourth driving signal, respectively.

11. The driving device as claimed in claim 1, wherein when the operation mode selection parameter saved in the register unit corresponds to the sine wave operation mode, the multiplexer output unit outputs the first sine wave driving signal, the sine step wave driving signal, the third sine wave driving signal, and the fourth sine wave driving signal of the second output unit through the low pass filter unit to the first driving signal, the second driving signal, the third driving signal, and the fourth driving signal, respectively.

12. The driving device as claimed in claim 1, wherein the multiplexer output unit further comprises an output driving stage, adapted for adjusting voltage levels and currents of the first driving signal, the second driving signal, the third driving signal, and the fourth driving signal, according to the setting saved in the register unit.

13. The driving device as claimed in claim 1, wherein the zero point detecting unit comprises a Schmitt trigger.

14. The driving device as claimed in claim 1, wherein the predetermined frequency parameter saved in the register is either 50 Hz or 60 Hz.

* * * * *